United States Patent [19]
Geisel

[11] 3,966,073
[45] June 29, 1976

[54] ELECTRIC CORD HATCH

[75] Inventor: Dennis M. Geisel, South Bend, Ind.

[73] Assignee: Mid America Sales Co., Inc, Elkhart, Ind.

[22] Filed: July 19, 1971

[21] Appl. No.: 163,897

[52] U.S. Cl. ............................ 220/3.8; 174/67; 220/242; 220/324; 339/44 R
[51] Int. Cl.² ...................... H02G 3/22; H05K 5/03
[58] Field of Search .............. 220/3, 5, 3.2, 3.8, 220/24.3, 29, 55 G, 55 Y, 242, 256, 259, 324; 174/66, 67; 339/36, 44 R, 44 M; 191/12 R

[56] References Cited
UNITED STATES PATENTS

| | | | |
|---|---|---|---|
| 532,361 | 1/1895 | Carabine | 220/55 Y |
| 945,753 | 1/1910 | Chamberlain et al. | 220/24.3 |
| 1,648,582 | 11/1927 | Dodge, Jr. | 191/12 R |
| 2,329,520 | 9/1943 | Duberstein et al. | 220/29 X |
| 2,470,320 | 5/1949 | Page | 220/3.8 X |
| 2,606,686 | 8/1952 | Barranco | 220/29 UX |
| 2,656,948 | 10/1953 | McGee | 220/29 |
| 2,891,102 | 6/1959 | Grimes | 220/24.3 X |
| 2,934,591 | 4/1960 | Tiikkainen | 220/24.3 X |
| 3,613,044 | 10/1971 | Rarick | 174/67 X |

FOREIGN PATENTS OR APPLICATIONS

| | | | |
|---|---|---|---|
| 645,445 | 7/1962 | Canada | 220/24.3 |

Primary Examiner—William Price
Assistant Examiner—Stephen Marcus
Attorney, Agent, or Firm—Marmaduke A. Hobbs

[57] ABSTRACT

A hatch for an electrical cord for mobile homes, campers, trailers and similar vehicles in which a hollow body is recessed into the vehicle wall and has a front member with a primary opening therein communicating with the hollow interior of the body, and a cover pivoted to the front member for closing the opening. A second opening of substantially the same size as the cord is provided, preferably in the cover, for the cord when it is in its extended and operating position, thus permitting the main cover to be closed while the cord is in its extended position. A second cover movably secured to the first cover closes the second opening when the cord is in its retracted position.

4 Claims, 6 Drawing Figures

ELECTRIC CORD HATCH

Mobile homes and trailers are often parked at courts and campsites and are connected to electrical service systems by the use of a cord set which is plugged into one of a number of outlet sockets in the system and into a socket or an adapter on the vehicle. In order to facilitate making the connection, a cord which is connected directly into the electrical wiring circuit of the vehicle is extended beyond the exterior wall of the vehicle where it can be readily connected, either directly or through a cord set, to the electrical system of the court or campsite. This cord is usually relatively short and is extensible and retractable by pulling it outwardly and pushing it inwardly through a hatch, and is carried permanently on the vehicle, fully enclosed in the wall of the vehicle behind the hatch. The hatch is normally secured to the wall and is provided with a door or cover which is retained in closed position while the cord is retracted and the vehicle is being moved. In the past the hatch has consisted of a hollow body or box-like structure recessed in the wall and containing a hole in the rear through which the cord is pulled from and pushed into a compartment in the vehicle where the cord is stored when not in use. When the vehicle is to be connected into an electrical system of the court or campsite, the cover of the hatch is opened and the free end of the cord is pulled outwardly beyond the side wall of the vehicle where it is connected to a cord set or directly into the electrical supply system. In the past, when the connection was in use the cord held the hatch cover open, thus permitting rodents and vermin to enter the vehicle through the hatch. In order to overcome this problem, some past models of the hatch included a door which had an outwardly protruding lip defining a permanently open hole through the cord extended while in use. This permanently opened hole likewise permitted pests to enter the vehicle when the cord was in its retracted position within the vehicle. It is therefore one of the principal objects of the present invention to provide a hatch having a cover structure which effectively closes the interior of the hatch, both when the cord is retracted within the wall of the vehicle and when it is extended outwardly from the hatch for connection with the electrical system of the court or campsite, and which is substantially flush with the external surface of the vehicle wall when the covers thereof are in closed position.

Another object of the invention is to provide a cord hatch which in effect has one opening for extending and retracting the cord from and into the vehicle, and another opening substantially the same size as the cord for the cord when it is in its extended position, and which has a door or cover for each opening.

Still another object is to provide a hatch structure of the aforesaid type which is simple to operate, neat in appearance and in which the covers are latched closed when the cord is in its retracted position and not in use.

A further object of the invention is to provide a hatch for the electrical circuit of mobile homes, campers, motor homes trailers and similar vehicles, which is simple in construction and can easily be fabricated, assembled and installed, and which is so designed and constructed that it can be readily adapted to different makes and models of such vehicles and easily operated to extend and retract the cord.

Additional objects and advantages of the invention will become apparent from the following description and accompanying drawings, wherein.

Figure 1:
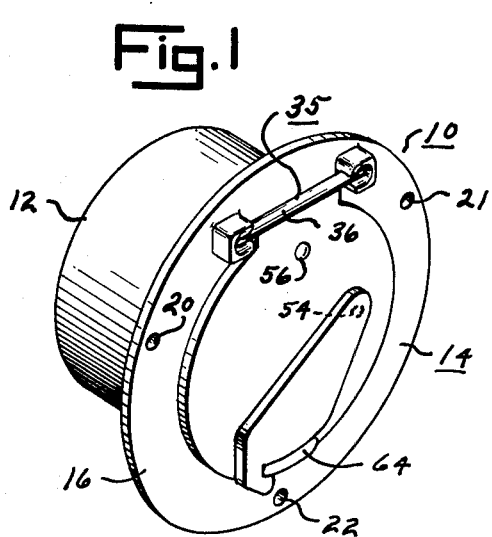
FIG. 1 is a perspective view of the present electrical cord hatch, showing the hatch in closed position.
Figure 2:
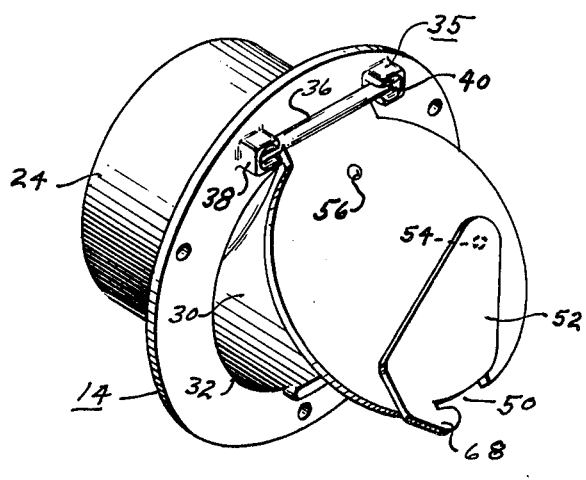
FIG. 2 is a perspective view similar to FIG. 1, showing the main door of the hatch in open position.

Referring more specifically to the drawings, numeral 10 indicates generally the present electrical cord hatch having a hollow cylindrical body portion 12 and a front member 14 of a generally disc-shaped configuration having a flange 16 extending outwardly beyond the periphery of the body to provide for seating on the external surface of the wall of a trailer, mobile home, camper or similar vehicle. The hatch is designed to seat in a recess with the body portion extending inwardly into the wall of the vehicle and communicating with a compartment in which the electric cord is retained when not in use and in which it is permanently connected to the electrical circuit of the vehicle. The hatch is secured to the wall structure of the vehicle by screws, nails, or the like extending through holes 20, 21 and 22 of flange 16 into the wall structure.

The body 12 consists of a cylindrical wall 24 joined integrally at its forward end with front member 14, and has an inwardly extending flange 26 forming a rear wall and defining a hole 28 through which the cord extends from the compartment in the wall or otherwise inside the vehicle structure. The cylindrical body, flange 26, and front member 14 are preferably formed integrally with one another, and may be made of plastic or other suitable, relatively rigid material.

The hollow interior 30 of the body, through which the cord extends when it is in use and in which the socket of the cord is retained when the cord is retracted and not in use, has a main opening 32 through which the cord is pulled from its compartment. This main opening has a primary cover 34 of generally disc-shaped construction, supported on flange 16 by a hinge structure 35. The hinge structure consists of a bar-like member 36 joined integrally to the upper edge of the door and supported at each end by fixtures 38 and 40 on flange 16 into which the ends of member 36 snap when pushed inwardly thereinto from the front. The cover 34 and the hinge structure 35, including the two supporting members 38 and 40, are preferably formed of plastic material of the same composition as body 12 and front member 14. The material may be white or any color to agree with the decorative material or design of the vehicle on which it is used. The main door is opened to permit the cord and socket to be easily pulled from and returned to the hatch and storage compartment in the vehicle, and can swing to wide open position so that it does not interfere with the manipulation of the cord in removing it from or returning it to its stored position.

A secondary opening of substantially the same size as the cord is provided in the front of the hatch so that primary cover 34 can be fully closed when the cord is extended outwardly during use thereof. In the embodiment of the invention illustrated in the drawings, the secondary opening 50 is in the primary door 34. This secondary opening is formed as a notch in cover 34, and the cord can be readily inserted therein as the primary cover 34 is swung inwardly to fully closed position. While the secondary opening 50 for the cord is shown in cover 34, other locations may be used if desired, such as the inner periphery of flange 16.

Figure 3:
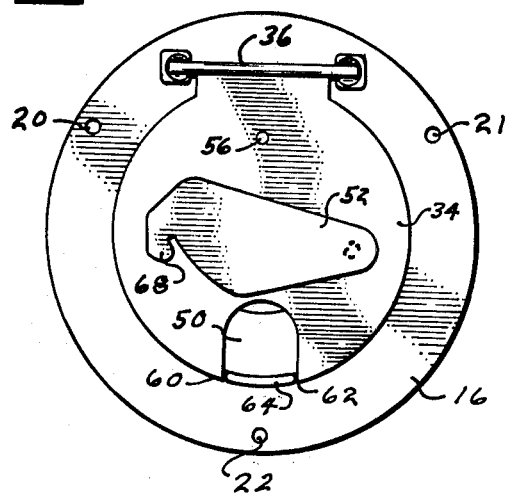
FIG. 3 is a front elevational view of the hatch shown in the preceding figures, showing the secondary door in open position.
Figure 4:
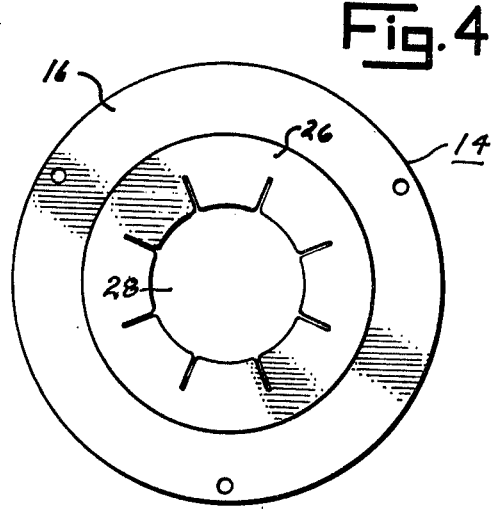
FIG. 4 is a rear elevational view of the hatch.
Figure 5:
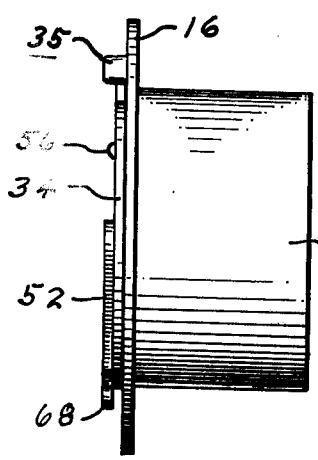
FIG. 5 is a side elevational view of the hatch with the covers in closed position.
Figure 6:
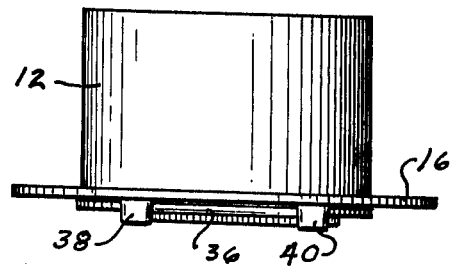
FIG. 6 is a top plan view of the electrical cord hatch shown in the preceding figures.

In order to prevent rodents and vermin from entering the hatch and storage compartment for the cord when the cord has been retracted inwardly to its non-operative position, a secondary cover 52 is provided for opening 50. Cover 52 is pivoted to cover 34 by a pin 54 formed integrally with cover 52 and extending through a hole in cover 34. The inner end of the pin is enlarged slightly to retain the pin in the hole in cover 34 so that it will not be accidentally dislodged therefrom, and yet can be pushed therein when cover 52 is assembled on cover 34. When cover 52 has been assembled on cover 34, it can be moved from its fully closed position, illustrated in FIG. 1, to its fully opened position illustrated in FIG. 3. A stop 56 is preferably provided on cover 34 to limit the movement of cover 52 in the opening direction.

To prevent accidental opening of cover 34, a latching structure consisting of corners 60 and 62 on the cover and lug 64 on the inner edge of flange 16, which is engaged on opposite edges by corners 60 and 62, retains cover 34 in a releasably closed position. The edges of lug 64 adjacent corners 60 and 62 are tapered slightly outwardly so that the corners are held inwardly when the door has been pressed to the fully closed position. To prevent accidental opening of cover 52, a tongue 68 defining a slot 70 locks under lug 64 when cover 52 has been moved to its closed position over opening 50. With the relationship of the pivot point determined by pin 54 to the curvature of the underside of lug 64, cover 52 cannot readily be unlatched and moved from its closed position, since tongue 68 grips the lower surface of lug 64. The release of cover 52 from lug 64 can be accomplished by disengaging tongue 68 from lug 64 by deflecting cover 52 outwardly sufficiently to bypass the outer end of lug 64 and thereby permit the cover 52 to be moved to its open position.

In the operation of the present electric cord hatch, the cord is retracted through the hollow interior of body 12 and rear opening 28, into the compartment in the vehicle for receiving the cord, and the plug on the end of the cord is seated in the interior of the body and retained therein on the inner side by inwardly extending flange 26 and on the outer side by cover 34. When the vehicle is traveling, the cord is retained in this position, with covers 34 and 52 held in latched position on lug 64. When the cord is to be connected to a cord set or directly into an electrical system at a court or campsite, cover 52 is opened and, with this cover open, cover 34 can be readily opened by inserting a finger in opening 50 and pulling cover 34 outwardly near the bottom thereof to disengage it from lug 64. The cord with the socket thereon is pulled outwardly into operative position for connection with the electrical system. Cover 34 is then closed and latched onto lug 64 while door cover 52 is retained in its open position. Since opening 50 is substantially the same size or only slightly larger than the cord, a rather snug fit is provided around the cord so that rodents or vermin cannot enter the hatch through opening 50 while the cord is projecting therefrom. Likewise, since cover 34 is closed, no access is afforded for the entrance of vermin or rodents.

When the vehicle is to be moved, the cord is disconnected from the court or campsite electrical system and door 34 is opened. The cord is then pushed inwardly through the hatch into the storage compartment for the cord and the plug seated in body 12. Doors 34 and 52 are then closed and latched in the position illustrated in FIG. 1, thereby preventing rodents, vermin and dirt from entering the hatch and storage compartment for the cord.

The secondary opening is shown in the main cover; however, it can be placed in the front member at the bottom or along the edge of the cover extending into flange 16 and the secondary cover placed either on the primary cover or on the flange.

While only one embodiment of the present electric cord hatch has been described in detail herein, various changes and modifications may be made without departing from the scope of the invention.

I claim:

1. A hatch for an electrical cord for mobile homes, campers, trailers and similar vehicles, comprising a hollow body, a plate-like front member attached to said body and having an opening therein communicating with the hollow interior of said body, a cover for said opening pivoted near the top to said front member, a means defining a notch-shaped opening in the lower portion of said cover for the cord while said cover is in closed position, a cover for said second mentioned opening extending beyond the periphery thereof and overlying a surface of said first mentioned cover when in closed position, said second mentioned cover being pivoted to said first mentioned cover and moving angularly from a position closing said second mentioned opening to a position at which said second mentioned opening is fully open, a latch means yieldably securing said covers in their closed positions, said latch means including a lug mounted on said hollow body and projecting through said notch-shaped opening and said second mentioned cover including a tongue extending under said lug releasably latching said second mentioned cover in its closed position, means for supporting said second mentioned cover for movement between closed and opened positions, and a cord opening in said body to the rear of said front member through which the cord can be extended and retracted.

2. A hatch for an electrical cord as defined in claim 1 in which said body includes a radially inwardly extending flange forming a rear wall and defining an opening in said rear wall for movement of the cord therethrough.

3. A hatch for an electrical cord as defined in claim 1 in which said front member includes a flange projecting radially outwardly from said hollow body and having holes therein for securing said hatch to the wall of the vehicle.

4. A hatch for an electrical cord as defined in claim 1 in which said front member is a flange projecting radially outwardly from said hollow body and having holes therein for securing said hatch to the wall of the vehicle.

* * * * *